(12) United States Patent
Matsuoka et al.

(10) Patent No.: US 8,991,670 B2
(45) Date of Patent: Mar. 31, 2015

(54) IN-VEHICLE MOBILE-TERMINAL HOLDING DEVICE

(71) Applicant: Honda Motor Co., Ltd., Tokyo (JP)

(72) Inventors: Yosuke Matsuoka, Wako (JP); Masamoto Ito, Wako (JP); Dai Takakuwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 13/945,271

(22) Filed: Jul. 18, 2013

(65) Prior Publication Data

US 2014/0021732 A1 Jan. 23, 2014

(30) Foreign Application Priority Data

Jul. 20, 2012 (JP) ................................ 2012-161808

(51) Int. Cl.

| B60R 11/00 | (2006.01) |
|---|---|
| B60R 7/04 | (2006.01) |
| F16M 13/02 | (2006.01) |
| B60R 11/02 | (2006.01) |
| F16M 11/04 | (2006.01) |
| F16M 11/10 | (2006.01) |
| F16M 13/00 | (2006.01) |

(52) U.S. Cl.
CPC ................. B60R 7/04 (2013.01); F16M 13/02 (2013.01); B60R 11/02 (2013.01); F16M 11/041 (2013.01); F16M 11/105 (2013.01); F16M 13/00 (2013.01); F16M 13/022 (2013.01); *B60R 2011/001* (2013.01); *B60R 2011/0082* (2013.01); *Y10S 224/929* (2013.01)
USPC ........... 224/276; 224/282; 224/549; 224/553; 224/929

(58) Field of Classification Search
CPC .................................................. B60R 2011/001
USPC ......... 224/276, 929, 282, 548, 549, 551, 553, 224/555, 556, 571; D14/253, 447
See application file for complete search history.

(56) References Cited

U.S. PATENT DOCUMENTS

| 1,730,790 | A | * | 10/1929 | Squires ............................. 40/644 |
|---|---|---|---|---|
| 4,444,343 | A | * | 4/1984 | Perlsweig ....................... 224/276 |
| 4,455,454 | A | * | 6/1984 | Umebayashi ............... 455/556.1 |
| 5,072,628 | A | * | 12/1991 | Oki ............................... 74/484 R |
| 5,222,690 | A | * | 6/1993 | Jeffords ......................... 244/1 R |
| 5,319,803 | A | * | 6/1994 | Allen ............................. 455/566 |
| 5,974,332 | A | * | 10/1999 | Chung ........................ 455/569.2 |
| 5,996,866 | A | * | 12/1999 | Susko et al. ................... 224/281 |
| 6,024,395 | A | * | 2/2000 | Kang ............................ 296/37.8 |
| 6,056,175 | A | * | 5/2000 | Mieglitz et al. ............... 224/282 |
| 2011/0024470 | A1 | * | 2/2011 | Hajarian ........................ 224/276 |

FOREIGN PATENT DOCUMENTS

| JP | 05-049512 U | 6/1993 |
|---|---|---|
| JP | 3017540 U | 8/1995 |

\* cited by examiner

*Primary Examiner* — Justin Larson
(74) *Attorney, Agent, or Firm* — Squire Patton Boggs (US) LLP

(57) ABSTRACT

An in-vehicle mobile-terminal holding device holds a mobile terminal on a steering post turnably supporting a steering wheel. The steering post is provided with a holder support member to the tip of which a holder configured to detachably hold the mobile terminal is attached. The holder support member can be housed in the steering post. The holder support member is formed in an arc shape as a whole. The steering post includes a pivot shaft supporting the root of the holder support member having an arc shape such that the holder support member is pivotable between a use position and a housed position. The steering post houses the holder support member in such a way that the arc shape of the holder support member follows the outer periphery of the steering post having a circular column shape.

20 Claims, 16 Drawing Sheets

IN-VEHICLE MOBILE-TERMINAL HOLDING DEVICE

BACKGROUND

1. Field

The present invention relates to an in-vehicle mobile-terminal holding device, and relates particularly to an in-vehicle mobile-terminal holding device which can detachably hold a mobile terminal at a position allowing a driver to easily see and operate the mobile terminal, without affecting the operability of peripheral parts, and which also takes into account appearance while holding no mobile terminal.

2. Description of the Related Art

Recently, the functions of mobile terminals such as mobile phones have been widened, and smart phones having not only a verbal communication function and an e-mail sending and receiving function but also a navigation function have become widespread. In view of this, one possible use of mobile terminals is that the mobile terminals are placed inside vehicles and used as navigation devices. For such possible use inside vehicles, the vehicles are desired to include a holding device to hold a mobile phone at a position allowing the driver to see and easily operate the mobile phone. Moreover, the holding device is desired to have a structure which not only allows a mobile phone to be attached to and held on the vehicle body but also allows the driver to easily remove the mobile phone therefrom when he or she leaves the vehicle.

An in-vehicle placement device for a mobile phone described in Patent Document 1 (Japanese Utility Model Registration Application Publication No. Hei 5-49512) is an example of a device capable of holding a mobile phone in a detachable manner. This in-vehicle placement device includes a mount which is bolted to a vehicle, a sheath-shaped holder to which a mobile phone can be inserted and fitted, and a support member with a flexible structure which fixes the holder to the mount. Moreover, Patent Document 2 (Registered Japanese Utility Model No. 3017540) describes an in-vehicle mobile-phone holding device including a holder body, a swing support which is biased by a spring, and an adjustment arm which holds a mobile phone in cooperation with the swing support. The adjustment arm of the holding device described in Patent Document 2 has a structure which is adjustable in position according to the width of the mobile phone.

The conventional in-vehicle placement device and in-vehicle mobile-phone holding device described in Patent Documents 1 and 2 are configured to be capable of detachably holding a mobile phone. However, they do not take account of interference with peripheral parts. To secure visibility to the driver, it is desirable to provide a mobile-phone holding device in front of the driver, that is, in the periphery of the steering wheel. However, parts such as various operation switches and the shift lever are arranged in the periphery of the steering wheel. Thus, the mobile-phone holding device may possibly interfere with these peripheral parts, impairing the visibility and operability of the peripheral parts. On the other hand, if the mobile-phone holding device is so arranged as not to interfere with the peripheral parts, the visibility and operability of the mobile phone may be impaired.

Moreover, in each of the conventional techniques, the mobile-phone holding device, when not holding any mobile phone, remains fixed in the same position as when holding a mobile phone, or around that position. This may spoil the periphery of the steering wheel and thereby impair the appearance.

SUMMARY

In view of the problems of the conventional techniques described above, an object of the present invention is to provide an in-vehicle mobile-terminal holding device which can detachably hold a mobile terminal at a position allowing the driver to easily see and operate the mobile terminal, does not affect the operability of peripheral parts, and can maintain good appearance while not holding any mobile terminal.

A first embodiment of the present invention for achieving the above object provides an in-vehicle mobile-terminal holding device for holding a mobile terminal inside a vehicle including a steering post turnably supporting a steering wheel. A holder support member is supported on the steering post. A holder configured to detachably hold the mobile terminal is attached to a tip portion thereof. The holder support member is configured to be housed in the steering post.

According to a second embodiment, the holder support member is formed in an arc shape. The steering post is in a circular column shape, and includes a pivot shaft supporting an end portion of the arc-shaped holder support member opposite from the tip portion thereof such that the holder support member is pivotable between a use position and a housed position. The steering post has a housing space to house the holder support member in such a way that the arc shape of the holder support member follows an outer periphery of the steering post having the circular column shape.

According to a third embodiment of the present invention, the steering wheel includes a gripping part, and at a use position of the holder support member, the holder is located radially outward of the gripping part in a front view of the steering wheel.

According to a fourth embodiment of the present invention, a stopper or stopper means for holding the holder support member at any one of two positions being a use position and a housed position to which a posture of the holder support member is changed from the use position by a predetermined angle is provided around the pivot shaft supporting the holder support member. The stopper means includes a ball receiving recess provided to any one of the holder support member and the steering post side. A ball can be provided to the other of the holder support member and the steering post side and biased by a spring toward the ball receiving recess.

According to a fifth embodiment of the present invention, the holder includes a horizontal portion which holds one side portion of the mobile terminal being rectangular in a front view thereof. Vertical portions rise from both ends of the horizontal portion, and come in contact with side portions of the mobile terminal adjacent to the one side portion. The holder is attached in such a way that a posture of the horizontal portion with respect to the holder support member is changeable by approximately 90° between a substantially horizontal position and a substantially vertical position.

According to a sixth embodiment of the present invention, the horizontal portion of the holder has a groove to which the one side portion of the mobile terminal is fitted.

According to a seventh embodiment of the present invention, the horizontal portion of the holder is split into two, and a spring is arranged in the two split horizontal portions in such a way as to apply contractive force in a direction to shorten a distance therebetween.

According to an eighth embodiment of the present invention, the steering post is provided with a circular pad which is located inside the circular gripping part of the steering wheel in the front view and is fixed to the steering post side such that the circular pad does not follow turn of the gripping part. A plurality of switches and a display configured to display information including at least an operating state of the vehicle are arranged along an outer circumference of the circular pad.

According to a ninth embodiment of the present invention, of the plurality of switches, frequently-used predetermined switches are arranged in left and right regions of the circular pad.

According to a tenth embodiment of the present invention, the holder support member is a pipe which is supported on the steering post, and to the tip portion of which the holder configured to detachably hold the mobile terminal is attached. The pipe is arranged horizontally with respect to the steering post. The pipe includes a plurality of pipe members of different diameters joined to each other. The pipe members adjacent to each other are configured to be extendable and retractable relative to each other by having an outer periphery of one pipe member slidably fitted to an inner periphery of the other pipe member. The plurality of pipe members in the retracted state are configured to be housed in the steering post.

According to certain embodiments of the present invention, when the mobile-terminal holder is used, the holder support member or the pipe members supporting the holder can be pulled out of the steering post and used. When the holder is not used, the holder support member or the pipe members can be housed in the steering post, thereby making the space around the steering wheel neat. Moreover, the mobile terminal can be held on the holder provided near the steering post. Accordingly, the driver can see and operate the mobile terminal without having to greatly shift his or her view from a forward facing state.

According to certain embodiments of the present invention, the holder support member can be housed along the outer periphery of the steering post. Thus, there is no protrusion from the outer peripheral surface of the steering post. This provides good appearance.

According to certain embodiments, the holder is located radially outward of the gripping part of the steering wheel. Thus, when the driver faces forward, he or she can see the screen of the mobile terminal held on the holder without the gripping part blocking his or her view.

According to certain embodiments, a clicking feeling is obtained when the ball becomes fitted in the ball receiving recess at each of the use position and the housed position of the holder support member. Thus, the operator can recognize when the holder support member is located at the use position or the housed position via tactile feeling.

According to certain embodiments, the holder can change its posture by 90°. The mobile terminal held on the holder can thus be held in two postures, vertical and horizontal.

According to certain embodiments, the mobile terminal can be held while being fitted in the groove. Accordingly, the holder can more reliably hold the mobile terminal against vibrations of the vehicle.

According to certain embodiments, the width of the holder can be increased or decreased for the various sizes of mobile terminals to be held on the holder. Moreover, the force of the spring makes it possible to hold such mobile terminals.

According to certain embodiments, the switches and the display are arranged and gathered at positions inward of the gripping part of the steering wheel. Accordingly, the peripheral area of the gripping part of the steering wheel can be simple.

According to certain embodiments, the switches determined in advance as being frequently used (such as a directional-signal switch) are arranged in the left and right regions of the circular pad. Thus, the driver can operate the switches while gripping the gripping part, by stretching his or her fingers.

According to certain embodiments of the present invention, the pipe including the plurality of pipe members is extendable and retractable. Accordingly, when the holder is not used, the pipe can be retracted and housed in the steering post. Moreover, the pipe can easily be pulled to the use position by extending it.

DETAILED DESCRIPTION

Figure 1:
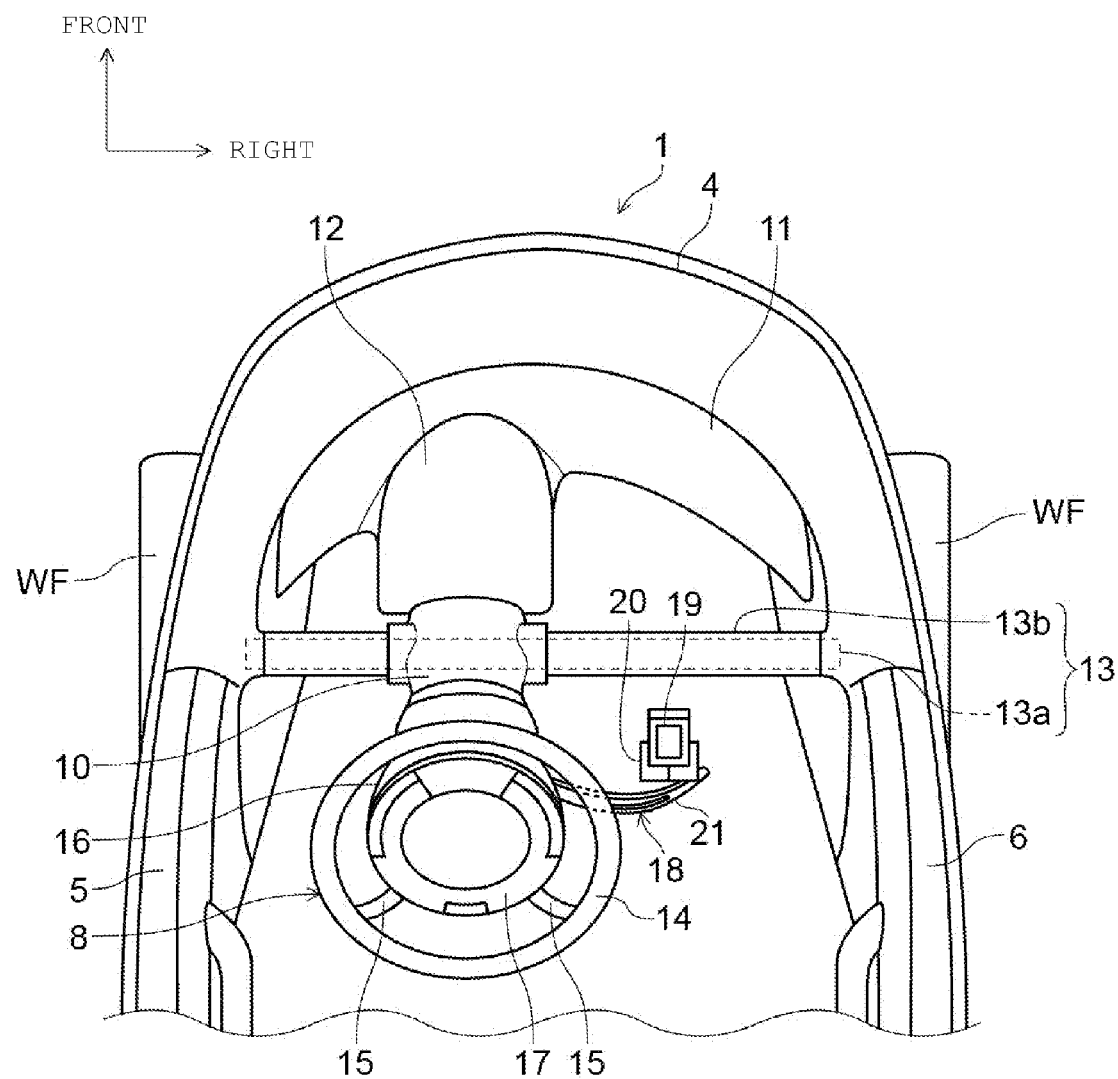
FIG. 1 is a top view of a front part of a vehicle including an in-vehicle mobile-terminal holding device according to an embodiment of the present invention.
Figure 2:
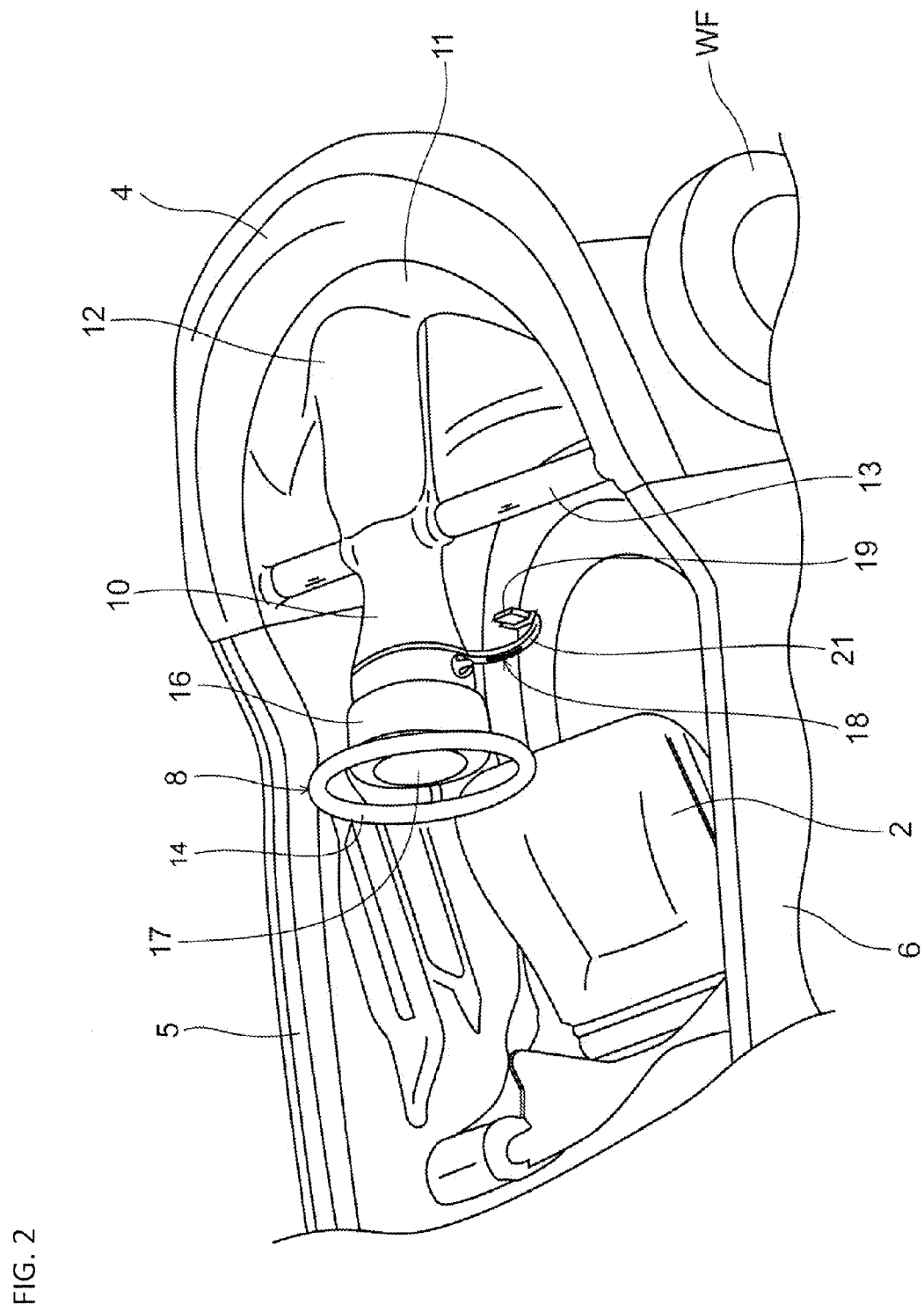
FIG. 2 is a perspective view of the front part of the vehicle including the in-vehicle mobile-terminal holding device according to the embodiment of present invention, as seen from a rear right side.

Embodiments of the present invention will be described with reference to the drawings. FIG. 1 is a top view of a front part of a vehicle including an in-vehicle mobile-terminal holding device according to embodiments of the present invention. FIG. 2 is a perspective view of the front part of the vehicle as seen from an upper rear right side. In FIGS. 1 and 2, a vehicle 1 is a four-wheeled electric vehicle for two people in which a driver seat 2 is arranged in the front part of the vehicle body, and a passenger seat 3 is arranged behind the driver seat 2. Note that in the illustrations of FIGS. 1 and 2, a windshield at the front and a canopy are removed for the sake of describing the arrangement of parts inside the vehicle. In this embodiment, the vehicle 1 can be an electric vehicle. However, the vehicles to which the present invention is applied are not limited to electric vehicles, and may be vehicles using an internal combustion engine as their drive sources and hybrid vehicles using an internal combustion engine and an electric motor as their drive sources. Moreover, the vehicles are not limited four-wheeled vehicles and may be three-wheeled vehicles.

In this example, the vehicle 1 includes a front body 4, to an upper portion of which the unillustrated windshield is attached. Left and right doors 5 and 6 which are openable and closable are provided at the rear of the front body 4, and front wheels WF are disposed on the left and right sides of the front body 4.

The driver seat 2 is arranged offset to the left or right from the center of the vehicle 1 in the vehicle width direction. Moreover, a steering wheel 8 is arranged at a position closer to the left side of the vehicle 1, which corresponds to the position of the driver seat 2.

A steering post 10 is provided which supports the steering wheel 8 turnably relative to the vehicle body. A front end portion of the steering post 10 is fixed to a protruding portion (boss) 12 of a bracket 11 which is either fixed to or formed integrally with the inner side of the front body 4. There is provided a beam 13 extending in the left-right direction through the steering post 10. The beam 13 is formed of a core member 13a made of metal and a cover member 13b made of a resin such as urethane or polypropylene and covering the core member 13a. The core member 13a is desirably a pipe with a rectangular cross-sectional shape, for example. The beam 13 can fix a longitudinally middle portion of the steering post 10 to the front body 4 to enhance the support strength. Also, as will be described later, the beam 13 includes an electrode part arranged along the longitudinal direction thereof, and may include a USB connection socket (female terminal) which can be electrically in contact with this electrode part. The beam 13 may be used also as a hanger to hang the driver's belongings or the like. Moreover, the cover member 13b may be superficially modified through painting or the like to improve the exterior of the beam 13.

Under the steering post 10 and the beam 13 is a large space, in which an accelerator and a brake pedal (not shown) are arranged. The driver seated on the driver seat 2 can operate these by moving his or her foot.

The steering wheel 8 is formed of a wheel 14 being a gripping part of a circular ring shape, multiple (two in this instance) spokes 15 extending from the wheel 14 toward the steering post 10, and a ring 16 joined to the spokes 15 extending from the wheel 14. The ring 16 is turnably provided to the steering post 10.

An angular sensor (not shown) which detects the angular position of the ring 16 with respect to the steering post 10 is provided to the steering post 10 at a position facing the ring 16. The angular sensor can be formed of a combination of magnetic bodies which are provided at predetermined angular intervals on the ring 16 side and a magnetic sensor which detects the magnetic bodies and outputs pulse signals, for example. The vehicle 1 is equipped with a control device including a microcomputer, and can have a driving function of driving the wheels WF by driving a drive motor with electric power supplied from a power source such as a battery, a detecting function of detecting the amount of turning operation of the steering wheel 8 on the basis of the pulse signals detected by the angular sensor, and a steering function of steering the front wheels of the vehicle 1 by driving a steering motor (not shown) on the basis of the amount of turning operation.

Means for steering the front wheels employs a steer-by-wire type in which the front wheels are steered with an electric motor on the basis of the detection signals of the angular sensor, but is not limited to this type. For example, it is possible to provide a steering shaft joined the ring 16 and to drive the front wheels by turning this steering shaft. It is also possible to combine a power steering mechanism which helps the steering of the front wheels by operating a hydraulic device or driving an electric motor in accordance with the amount of turn of the steering shaft.

To the steering post 10, a circular pad 17 is attached which is located inside the wheel 14 in a front view thereof (i.e. as seen from a direction facing a widthwise cross section of the steering post 10). The circular pad 17 is provided with multiple switches and a display to be described later with reference to FIG. 11.

The vehicle 1 includes a mobile-phone holding device 18 for placing a mobile phone, or a mobile terminal, inside the vehicle. The mobile-phone holding device 18 includes a holder 20 which has parts (described later in detail) to be in contact with lower, left, and right portions of the mobile phone 19, and a holder support member 21, to the tip of which the holder 20 is attached. The holder support member 21 is a component curved in an arc shape. A root portion of the holder support member 21, i.e. a portion located opposite from the tip to which the holder 20 is attached, is pivotally supported on a right portion of the steering post 10. The mobile-phone holding device 18 is configured as a unit formed of the holder 20, the holder support member 21, a pivot shaft pivotally supporting the holder support member 21, and a member supporting the pivot shaft (described later in detail). The mobile-phone holding device 18 thus configured as a unit is mounted to the steering post 10.

The holder support member 21 is configured such that when the mobile-phone holding device 18 is used, the holder support member 21 is swung clockwise about its pivot shaft to be unfolded to a position shown in FIG. 1. On the other hand, when the mobile-phone holding device 18 is not used, the holder support member 21 is swung counterclockwise about its pivot shaft to be housed into the steering post 10. The dimensions of the holder support member 21 and each member pivotally supporting the holder support member 21, as well as the curvature of the curve are determined such that the mobile-phone holding device 18 does not project from the outer peripheral surface of the steering post 10, or is preferably flush with the outer peripheral surface of the steering post 10, when the holder support member 21 is housed.

Note that the dimensions and shape of the holder support member 21 and the attached position thereof to the steering post 10 are set such that the holder 20 attached to the tip of the holder support member 21 is located radially outward of the wheel 14 when the holder support member 21 is in its use position. In this way, the screen, or the front side, of the mobile phone 19 will be visible from the driver seat 2.

Figure 3:
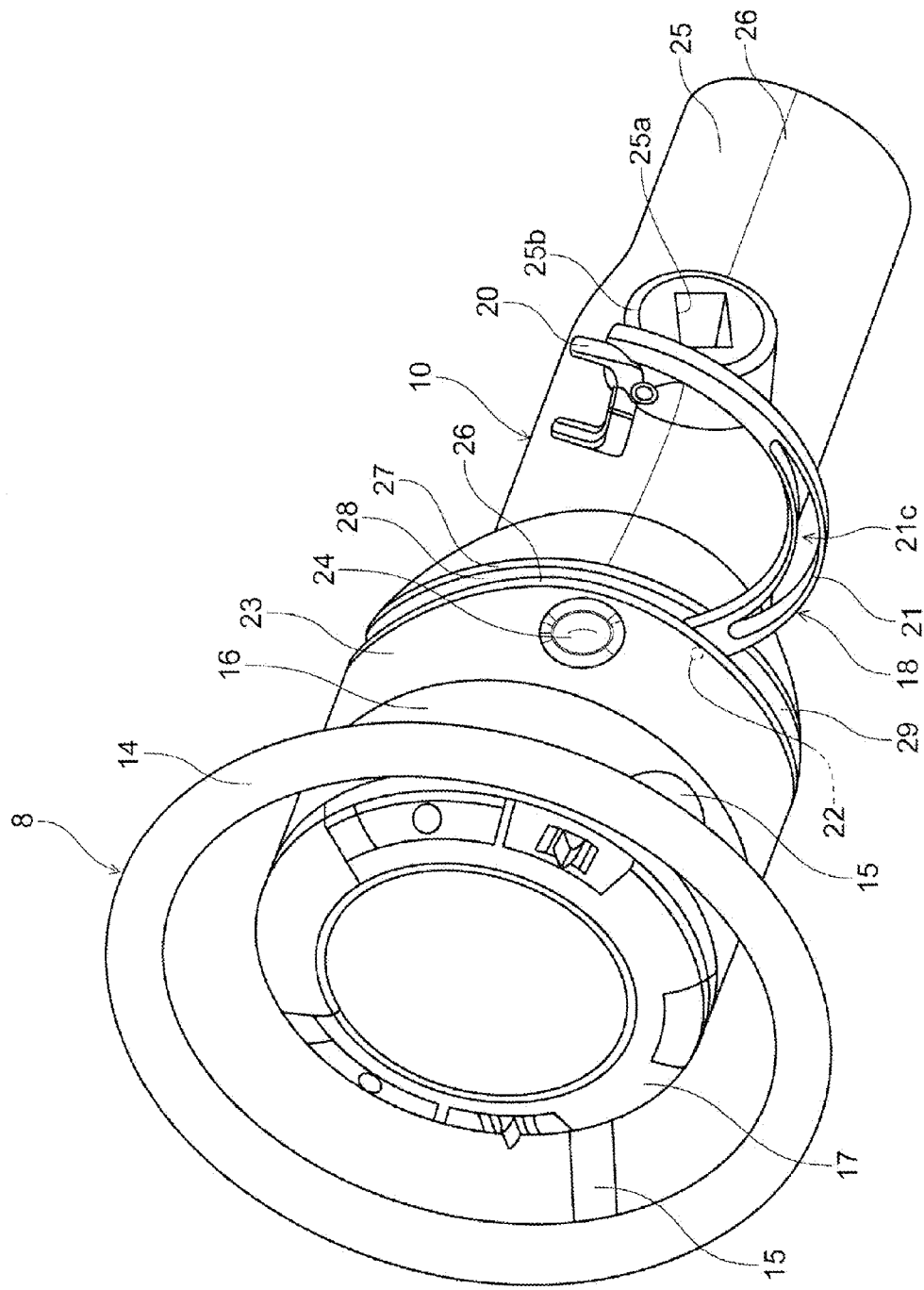
FIG. 3 is a perspective view showing a main part of the vehicle including a steering wheel and a steering post.
Figure 4:
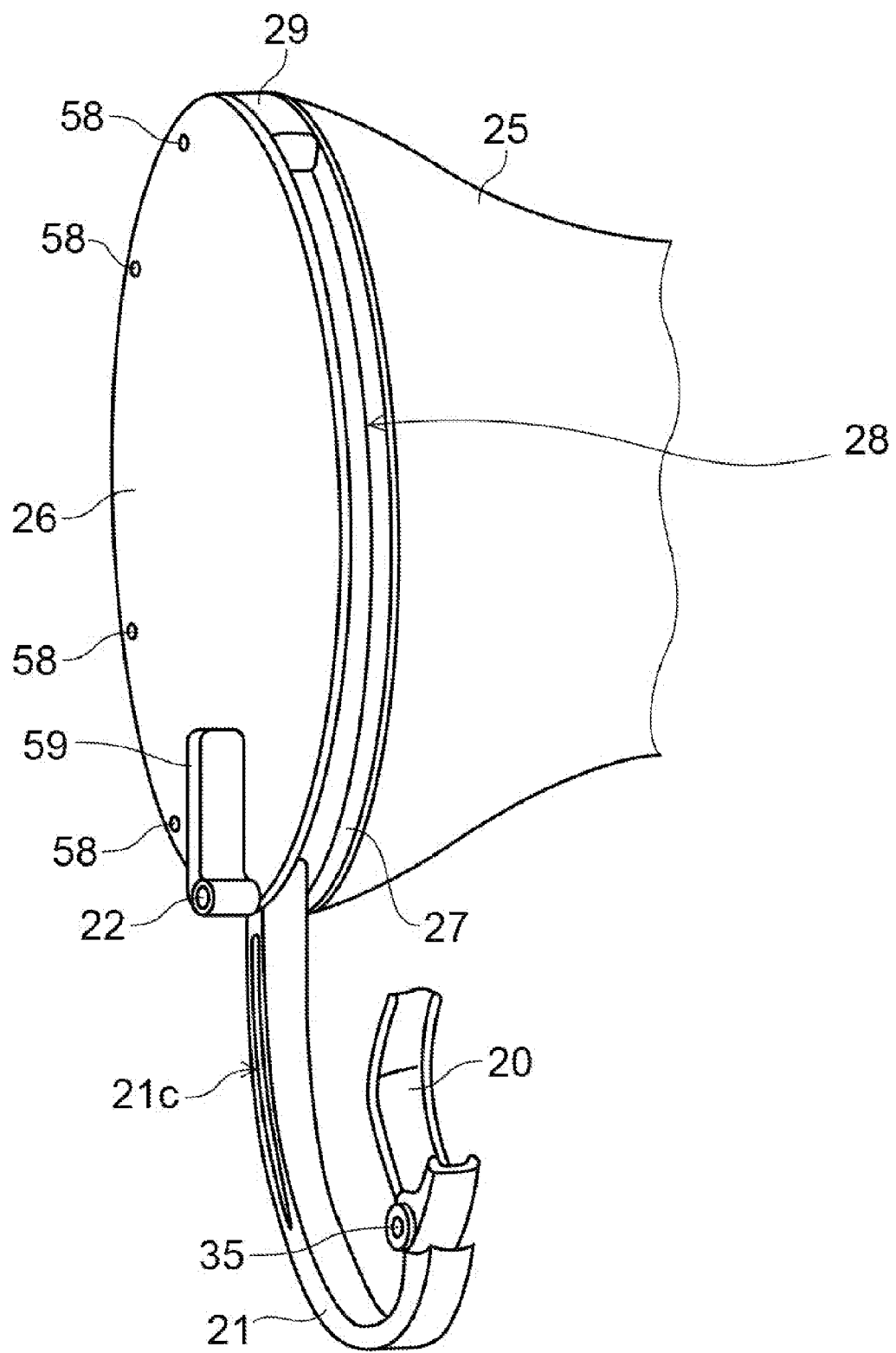
FIG. 4 is a perspective view of the mobile-phone holding device showing its attachment structure to the steering post.
Figure 5:
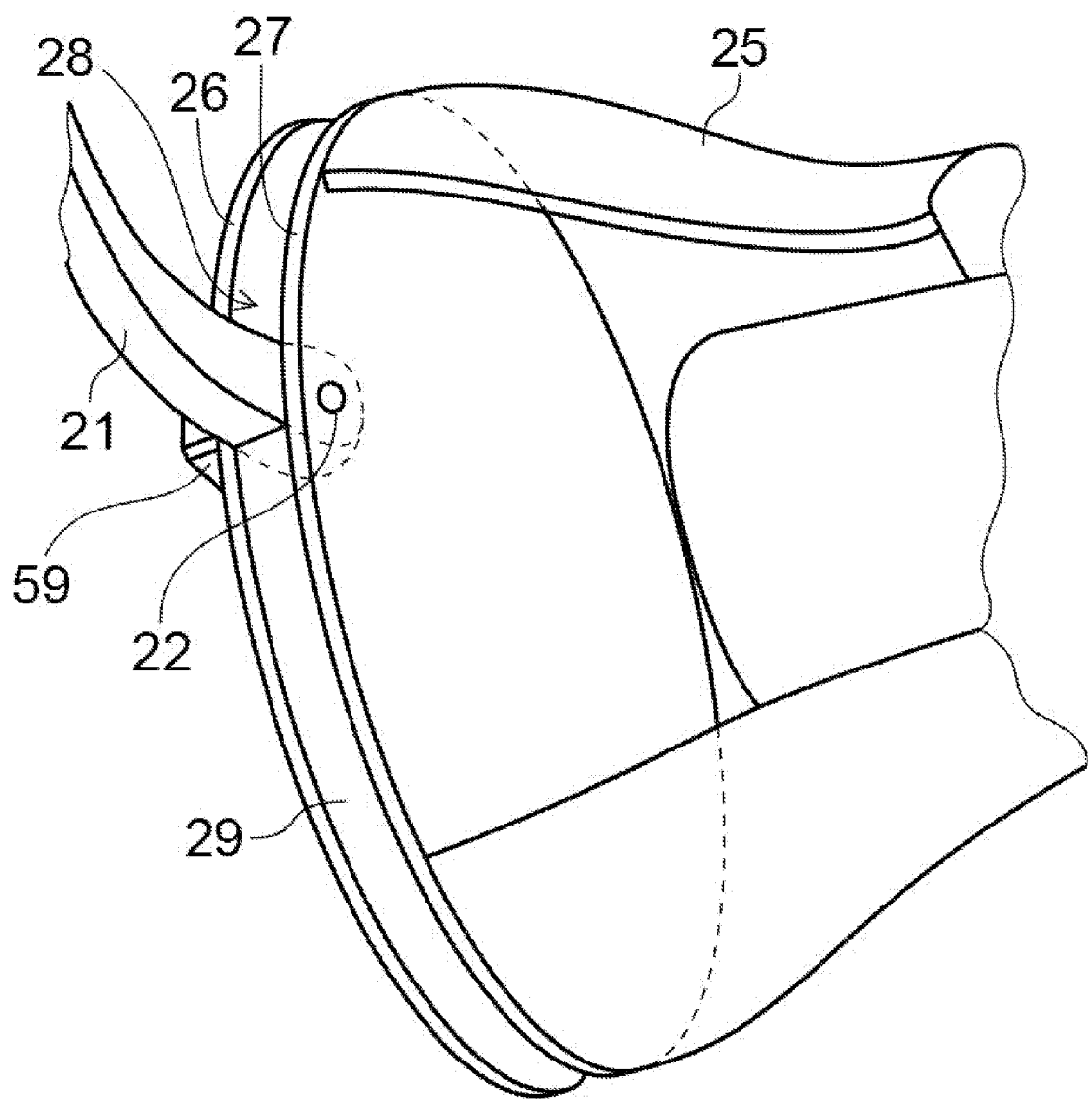
FIG. 5 is a perspective view of a main part of the mobile-phone holding device as seen from a front body side of the vehicle.

FIG. 3 is a perspective view showing a main part of the vehicle 1 including the steering wheel 8 and the steering post 10. FIG. 4 is a perspective view of the mobile-phone holding device 18 showing its attachment structure to the steering post 10. FIG. 5 is a perspective view of a main part of the mobile-phone holding device 18 as seen from below, i.e. from the front body 4 side.

In FIG. 3, a main switch 24 is provided on the right side of a circular column part 23 of the steering post 10 that is given forward of the ring 16 which the front end of each spoke 15 extending forward from the wheel 14 of the steering wheel 8 is bonded to. By performing an activating operation of the main switch 24, electric power can be supplied to the control device from a power unit (on-board battery).

A circular tip column part 25 being a base part of the steering post 10 is provided at a position closer to the tip of the steering post 10 than the circular column part 23 is. The mobile-phone holding device 18 including the holder support member 21 is arranged between the circular column part 23 and the circular tip column part 25. A through-slit 21c to improve visibility around the dashboard is formed in the holder support member 21.

Referring also to FIGS. 4 and 5, the mobile-phone holding device 18 includes a pivot shaft 22 of the holder support member 21 and support plates 26 and 27 supporting the pivot shaft 22. The pivot shaft 22 is supported on a shaft holder 59 fixed to the support plate 26. The support plates 26 and 27 are circular plates and arranged facing each other with a gap therebetween. A housing portion 28 capable of housing the holder support member 21 is formed between the support plates 26 and 27. The housing portion 28 occupies only part of the circumferences of the support plates 26 and 27, and a spacer 29 is arranged on the remaining part of the circumferences. With the holder support member 21 housed between the support plates 26 and 27, the spacer 29 externally appears connected to the holder support member 21 and forms a circular ring. Multiple pin holes 58 used at the time of assembling the steering post 10 are formed in the support plate 26.

The mobile-phone holding device 18 is mounted to the steering post 10 by connecting the support plate 26 to the circular column part 23 and connecting the support plate 27 to the circular tip column part 25. Note that circular tip column part 25 is split to two along a split surface, and bosses 25b each surrounding a hole 25a through which the core member 13a of the beam 13 penetrates are formed.

Figure 6:
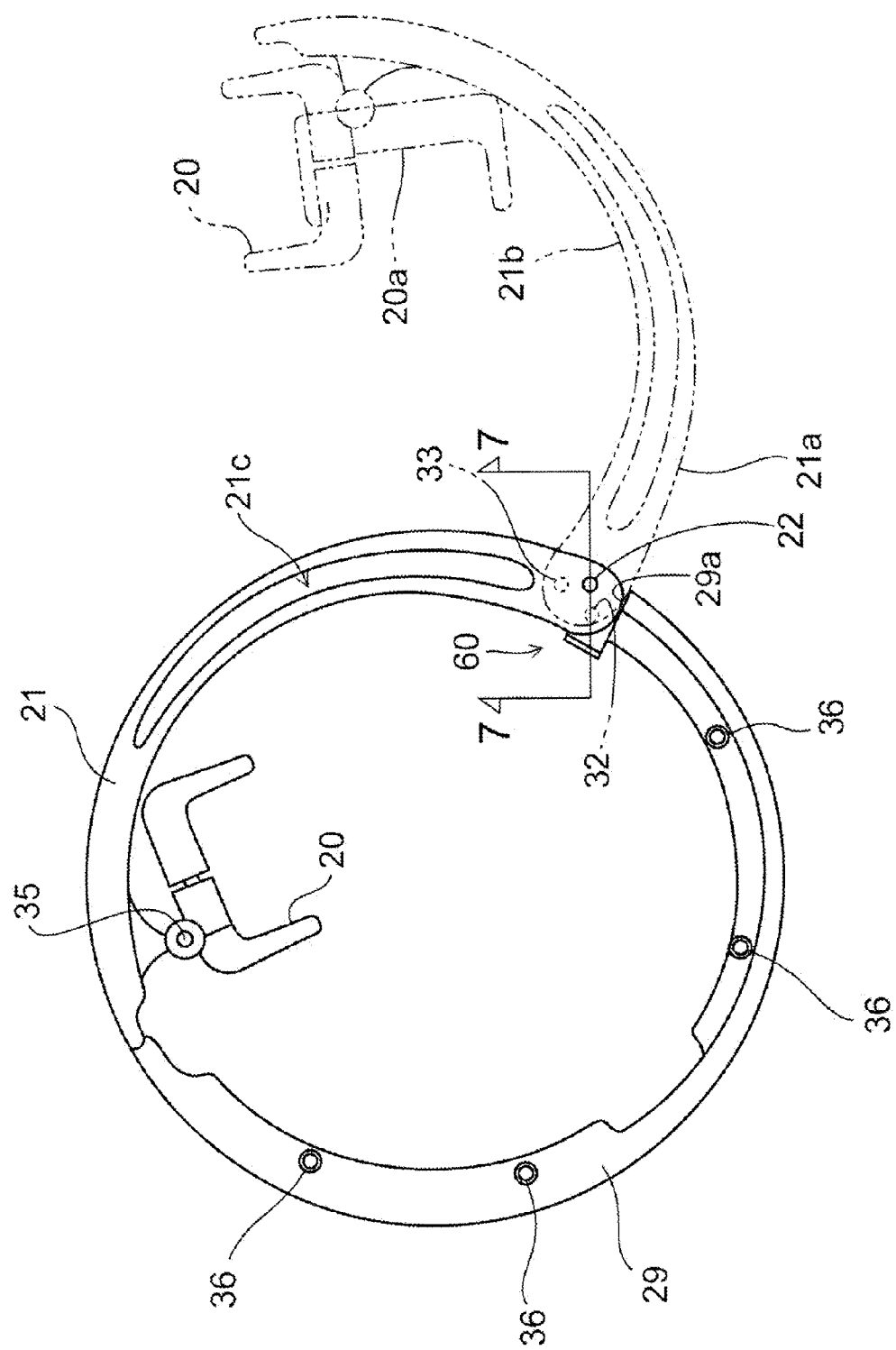
FIG. 6 is a front view of a spacer and a holder support member included in the mobile-phone holding device.
Figure 7:
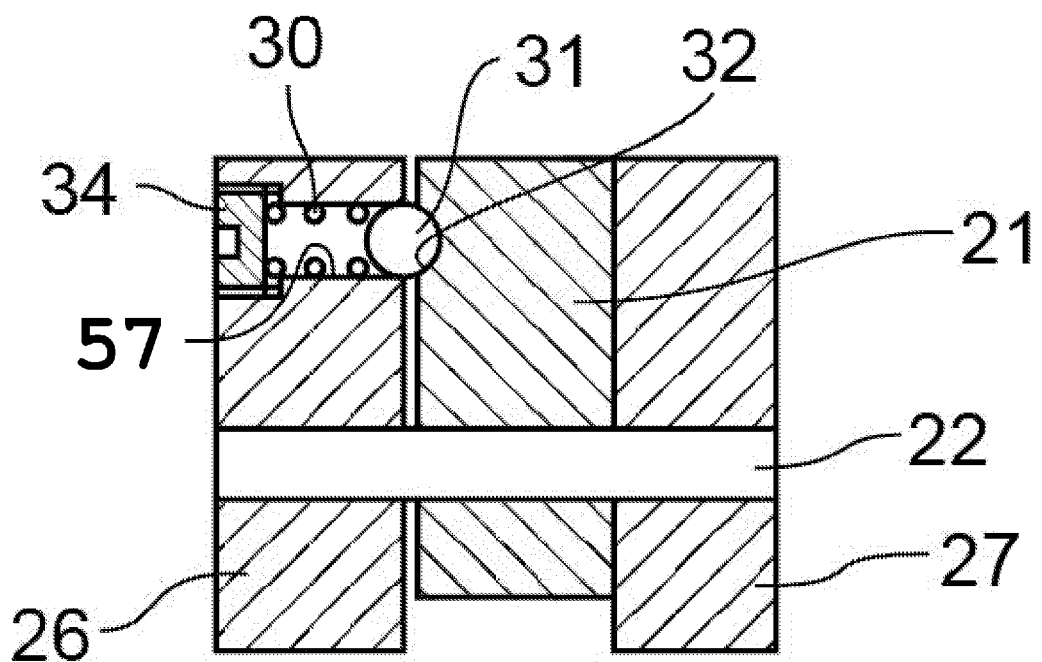
FIG. 7 is a cross-sectional view of a portion including support members and the holder support member, taken along line 7-7 in FIG. 6.

FIG. 6 is a front view of the spacer 29 and the holder support member 21. FIG. 7 is a cross-sectional view of a portion including the support plates 26 and 27 and the holder support member 21, taken along line 7-7 in FIG. 6. The pivot shaft 22 configured to pivotally support the holder support member 21 on the support plates 26 and 27 penetrates through the support plates 26 and 27 and the holder support member 21. Both ends of the pivot shaft 22 are fixed to the support plates 26 and 27. The holder support member 21 is swingably and loosely fitted to the pivot shaft 22. A ball 31 biased toward the holder support member 21 by a compression coil spring 30 is held in the support plate 26. A ball receiving recess 32 in which part of the ball 31 can be fitted is formed in the surface of the holder support member 21 facing the support plate 26. The position of the ball receiving recess 32 is determined such that it creates clicking feeling when the ball 31 becomes fitted thereinto as a result of housing the holder support member 21. The ball receiving recess 32, a ball receiving recess 33, and the ball 31 together form stopper means 60 for holding the holder support member 21 at a predetermined position.

A nut 34 is threadedly inserted in a hole 57 housing the compression coil spring 30 and the ball 31. The compression coil spring 30 biasing the ball 31 can adjust its force that biases the ball 31 toward the holder support member 21 by moving the nut 34 toward or away from the compression coil spring 30. To unfold the holder support member 21, force greater than the biasing force on the ball 31 is applied to pivot the holder support member 21 in the counterclockwise direction in FIG. 6. As a result, the ball receiving recess 32 is disengaged from the ball 31, so that the holder support member 21 can be unfolded to a position illustrated by two-dot chain lines in FIG. 6. At the unfolded position, the holder support member 21 has its outer side surface 21a in contact with an end 29a of the spacer 29, thereby being positioned.

To house the holder support member 21, first, the holder 20 is pivoted about a pivot shaft 35 toward an inner side surface 21b of the holder support member 21 to fold the holder 20 to a position 20a in FIG. 6. In this way, the swing radius of the holder support member 21 about the pivot shaft 22, inclusive of the holder 20, can be reduced, and thus the holder support member 21 can be housed compactly.

Note that the ball receiving recess 32 may be formed additionally in another location so that a clicking feeling can be obtained at the unfolded position of the holder support member 21. In FIG. 6, the ball receiving recess 33 is provided in addition to the ball receiving recess 32. The first ball receiving recess 32 engages with the ball 31 at the housed position of the holder support member 21, whereas the second ball receiving recess 33 engages with the ball 31 at the unfolded position of the holder support member 21. Thus, a clicking feeling of the holder support member 21 can be obtained at each position.

The arrangement of the ball receiving recesses 32 and 33, the compression coil spring 30, and the ball 31 is not limited to the arrangement shown in FIGS. 6 and 7. For example, it is possible to provide the ball receiving recesses 32 and 33 to one of the support plates 26 and 27 and provide the compression coil spring 30 and the ball 31 to the holder support member 21.

In FIG. 6, the spacer 29 is provided with pins 36 penetrating therethrough in the thickness direction in multiple locations (four locations in this instance). Each of the pins 36 is preferably a spring pin which is radially flexible. Fitted in pin holes formed in the support plates 26 and 27 (the pin holes 58 formed in the support plate 26 are shown in FIG. 4), the pins 36 serve a function of positioning the spacer 29 with respect to the support plates 26 and 27.

Note that the holder support member 21 is mounted to the steering post 10 together with the support plates 26 and 27 as a unit for the sake of easy assembly. However, the holder support member 21 may be supported directly on the steering post 10 without the support plates 26 and 27 and the like therebetween.

Figure 8:
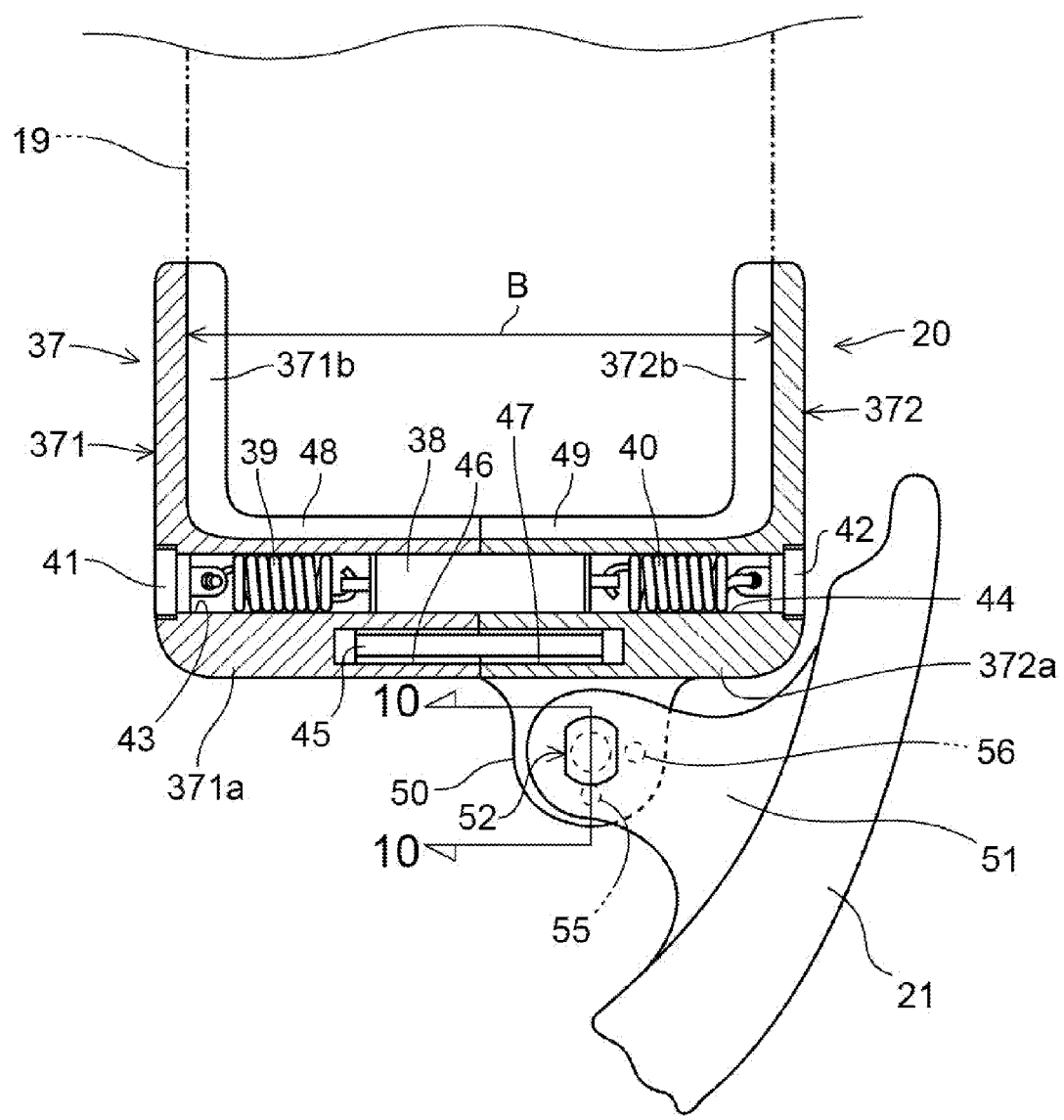
FIG. 8 is a cross-sectional view of a center portion of a holder in its thickness direction, taken along a plane perpendicular to the holder support member.
Figure 9:
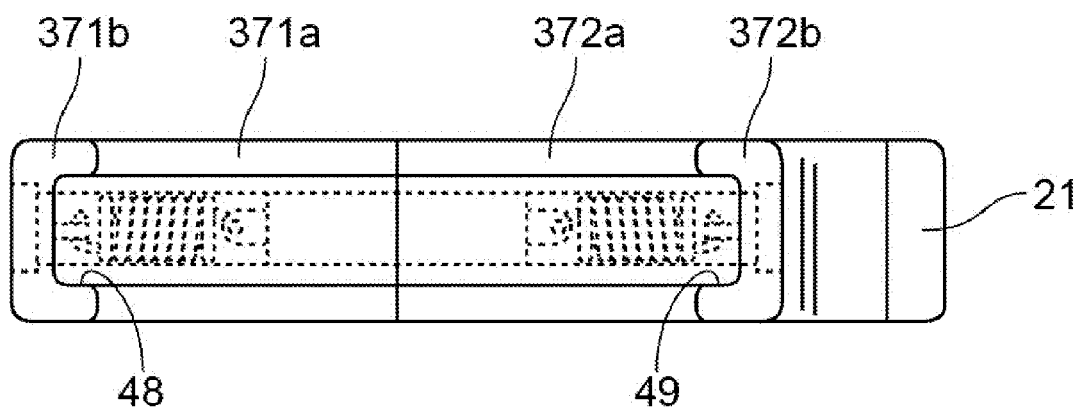
FIG. 9 is a top view of the holder.
Figure 10:
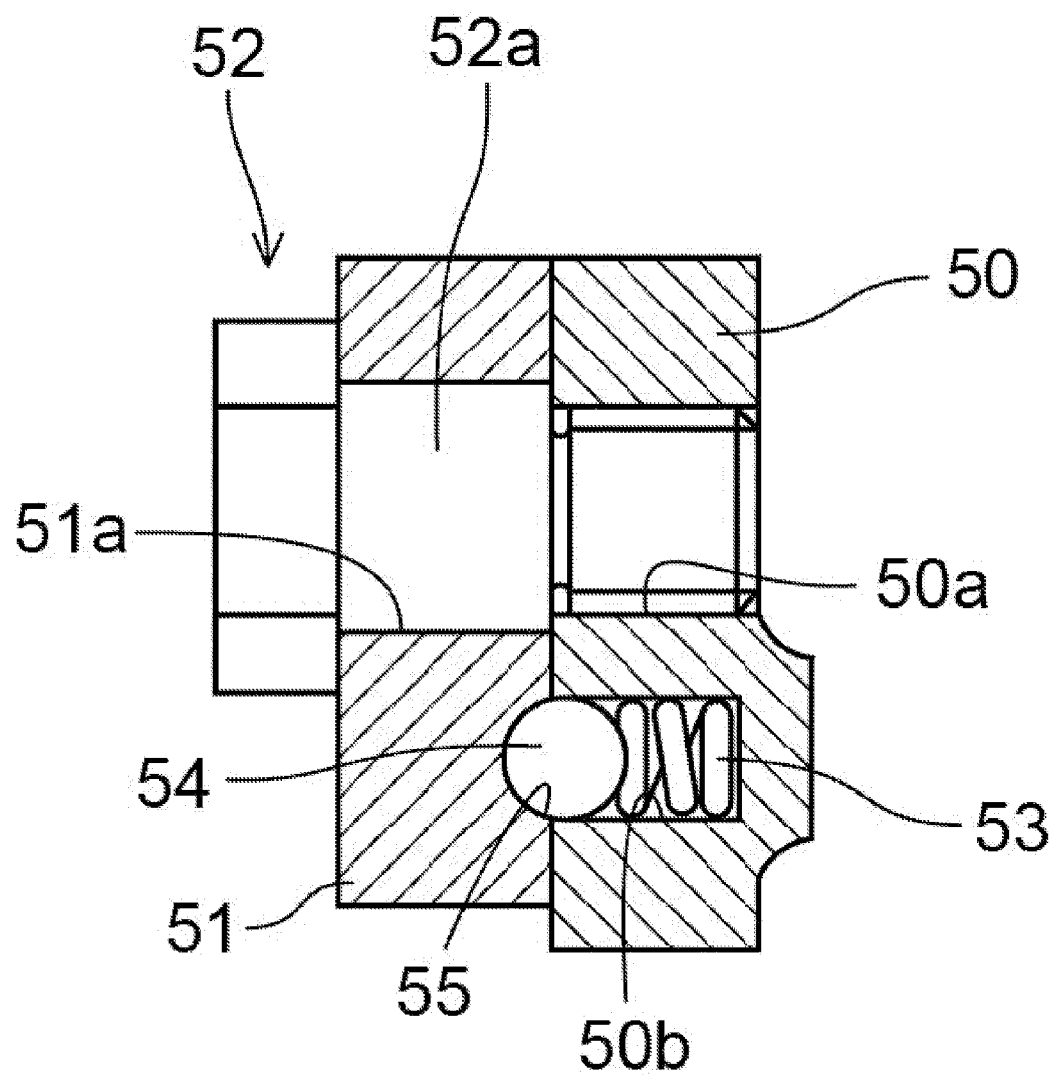
FIG. 10 is a cross-sectional view taken along line 10-10 in FIG. 8.

Next, the configuration of the holder 20 and the joining structure of the holder 20 to the holder support member 21 will be described. FIG. 8 is a cross-sectional view of a center portion of the holder 20 in its thickness direction, taken along a plane perpendicular to the holder support member 21. FIG. 9 is a top view of the holder 20. FIG. 10 is a cross-sectional view taken along line 10-10 in FIG. 8. In FIGS. 8 to 10, the holder 20 includes a holder body 37 split to a left part 371 and a right part 372. The left part 371 includes a horizontal portion 371a and a vertical portion 371b rising vertically from the horizontal portion 371a. The right part 372 includes a horizontal portion 372a and a vertical portion 372b rising vertically from the horizontal portion 372a.

In the horizontal portions 371a and 372a, holes 43 and 44 are formed, respectively, which stores a guide 38 of a circular column shape configured to align the left part 371 and the right part 372 with each other. Tension coil springs 39 and 40 are also stored, with their ends on one side locked on both sides of the guide 38, respectively. Hooks 41 and 42 which the ends of the tension coil springs 39 and 40 on the other side are locked on, respectively, are also stored therein. The hooks 41 and 42 are locked on side portions of the left part 371 and the right part 372. The guide 38 is provided slidably in the holes 43 and 44. The left part 371 and the right part 372 further include holes 46 and 47 in which a sub-guide 45 of a circular column shape is provided slidably. If the gap between the left part 371 and the right part 372 changes, the guide 38 and the sub-guide 45 accordingly slide inside the holes 43 and 44 and the holes 46 and 47 to maintain the left part 371 and the right part 372 in the aligned state.

In the left part 371 and the right part 372, grooves 48 and 49 are formed which extend in the upper surfaces of the horizontal portions 371a and 372a and the inner side surfaces of the vertical portions 371*b* and 372*b*. The grooves 48 and 49 are formed such that a lower part of the mobile phone 19 can be fit therein.

The left part 371 and the right part 372 are such that at least the grooves 48 and 49 are aligned with each other by the guide 38 and the sub-guide 45. Moreover, the left part 371 and the right part 372 are biased by the tension coil springs 39 and 40 in such a direction as to approach each other. Thus, the gap between the left part 371 and the right part 372 is adjusted according to the width of the mobile phone 19 whose lower part is held by the grooves 48 and 49. In FIG. 8, the left part 371 and the right part 372 are in contact with each other; thus, in the vertical portions 371*b* and 372*b*, a gap B between the grooves 48 and 49 holding the mobile phone 19 is minimum. In the case of holding a mobile terminal 19 of a width greater than the minimum gap B, the left part 371 and the right part 372 are pulled in a direction to separate them from each other against the tensile forces of the tension coil springs 39 and 40.

A stay 50 protrudes from a lower portion of the right part 372, while a stay 51 protrudes from the holder support member 21. A threaded hole 50*a* is formed in the stay 50. The stay 51 is provided with a bolt hole 51*a* which is penetrated by a bolt 52 screwed in the threaded hole 50*a*. The bolt 52 is a shoulder bolt. When the bolt 52 is screwed in and fastened to the threaded hole 50*a*, a shoulder portion 52*a* of the bolt 52 secures a gap that allows the stay 51 to move relative to the stay 50. In the stay 50, a ball receiving recess 50*b* is formed which houses a compression coil spring 53 and a ball 54 biased toward the stay 51 by the compression coil spring 53. Ball receiving recesses 55 and 56 are provided which allow the ball 54 to become fitted and locked at either of two predetermined locations when the stay 50 is pivoted relative to the stay 51 about the bolt 52. In FIG. 8, the ball 54 is locked on the ball receiving recess 55 to hold the holder 20 horizontally. The ball 54 is locked on the ball receiving recess 56 at a position to which the holder 20 is pivoted 90 degrees counterclockwise from the position of FIG. 8. At this position, the mobile phone 19 can be held in a posture changed by 90 degrees.

Note that in the instance described with reference to FIG. 8 and other drawings, the multiple tension coil springs 39 and 40 are used to bias the parts 371 and 372 in such a direction as to shorten the gap therebetween. However, the present invention is not limited to the use of tension coil springs, and may be changed such that compression coil springs are used to shorten the gap between two parts configured to hold a mobile phone. Moreover, the number of tension coil springs is not limited to two and may be one.

Figure 11:
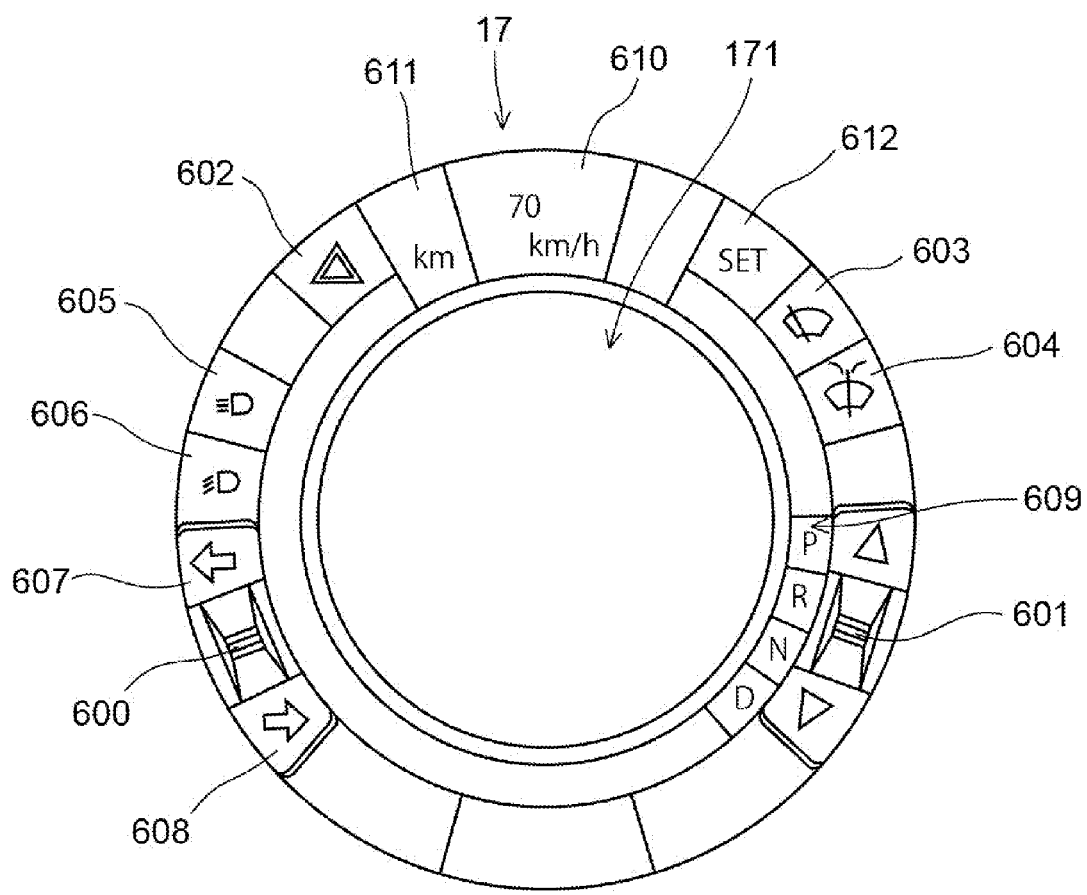
FIG. 11 is a front view of a circular pad arranged in front of the steering post.

FIG. 11 is a front view of the circular pad 17 arranged in front of the steering post 10. In FIG. 11, an unillustrated airbag and horn switch are housed in a center part of the circular pad 17. The airbag and the horn switch are covered with a cover 171. Multiple switches and indicators are arranged on an outer peripheral part of the circular pad 17. The switches include a directional-signal switch 600, a shift switch 601, a hazard-flasher switch 602, a wiper switch 603, a windshield-washer switch 604, a high-beam switch 605 and a low-beam switch 606 for the headlight, and so on.

The directional-signal switch 600 may be tilted upward to indicate intent to turn left, and the directional-signal switch 600 may be tilted downward to indicate intent to turn right. A left-turn indicator 607 and a right-turn indicator 608 light up in response to the left-turn and right-turn operations of the directional-signal switch 600. The shift switch 601 is designed for gear shift of an automatic transmission, and the shift position is indicated by a shift-position indicator 609. The shift-position indicator 609 indicates a park position P, a reverse travel position R, a neutral position N, and a forward travel position D, each with a lamp. A shift position is selected through the shift switch 601 in accordance with the layout of the shift-position indicator 609. For example, if the current shift position is the neutral position N, tilting the shift switch 601 downward will change the shift position to the forward travel position D. Tilting the shift switch upward from that position can bring the shift position back to the neutral position N. Performing an upwardly tilting operation of the shift switch 601 twice from the forward travel position D will select the park position P. The other switches 602, 603, 604, 605, and 606 each function as a lamp-type indicator as well. Each of these switches 602 to 606 is such that its lamp lights up in response to a pushing operation thereof, and the lamp goes off in response to another pushing operation while the lamp is on.

The directional-signal switch 600 and the shift switch 601, which are frequently used, are arranged on the very left and right sides of the circular pad 17, respectively. A speed display device 610 is arranged in an upper portion of the circular pad 17 (an upper portion in FIG. 4). The speed display device 610 digitally displays the travel speed of the vehicle 1. An odo/trip meter 611 that functions as both an odometer and a trip meter is arranged on the left of the speed display device 610. A select switch 612 used to select between the odometer and the trip meter is provided next to the wiper switch 603.

Figure 12:
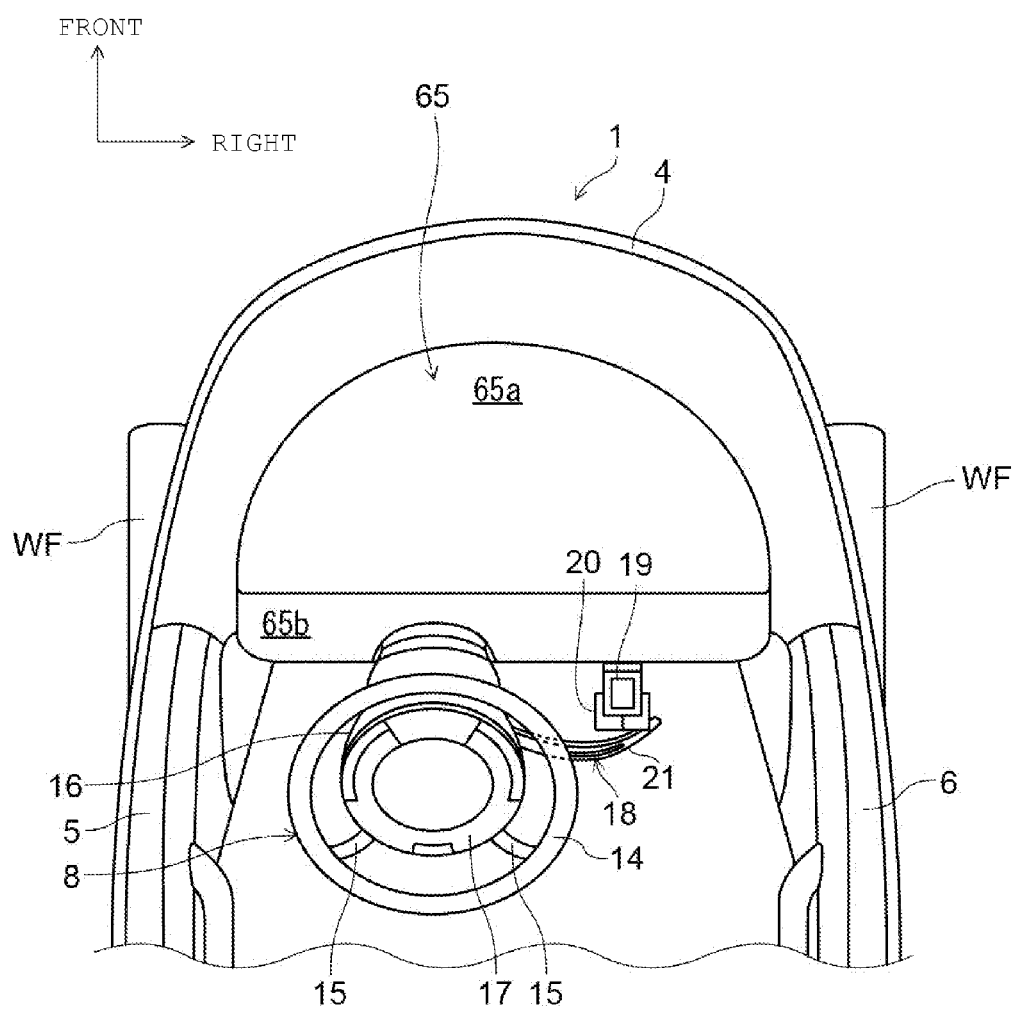
FIG. 12 is a top view of the front part of the vehicle including a dashboard.
Figure 13:
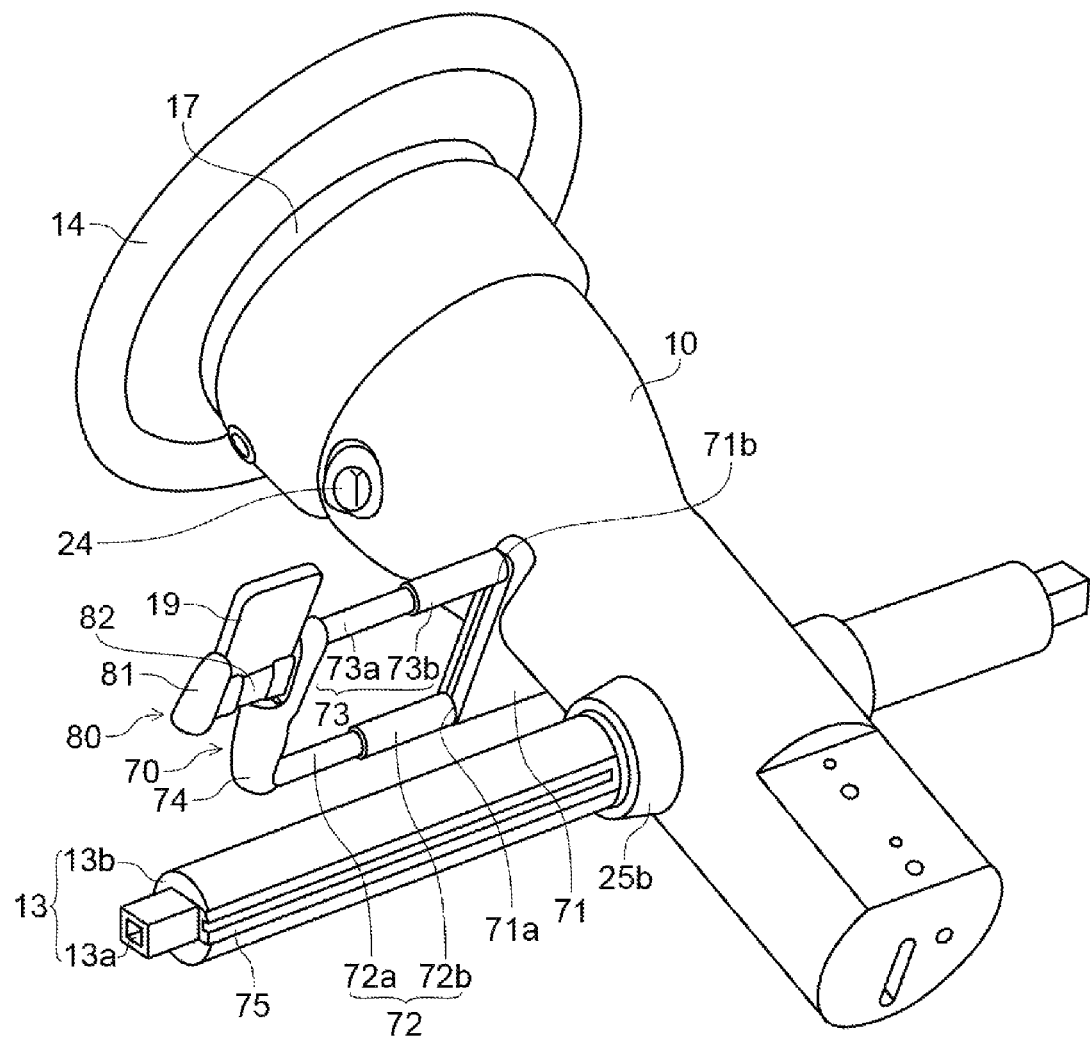
FIG. 13 is a perspective view of a main part of a vehicle including a mobile-phone holding device according to a second embodiment.

The bracket 11 and the beam 13 in the front part of the cabin of the vehicle 1 shown in FIGS. 1 and 2 can be used in an exposed state but may be provided with a dashboard covering them. FIG. 12 is a top view of the front part of the vehicle 1 including a dashboard 65 covering the bracket 11 and the beam 13. In FIGS. 12 and 13, the same reference numerals as those in FIGS. 1 and 2 denote the same or similar parts. The dashboard 65 is formed of a flat part 65*a* and a vertical part 65*b* connected to the flat part 65*a*. The dashboard 65 is attached to the inner side of the front body 4 in such a way as to cover the bracket 11 and the beam 13 described with reference to FIGS. 1 and 2, as well as the circular tip column part 25 of the steering post 10, and so on.

Next, another embodiment of the present invention will be described. FIG. 13 is a perspective view of a main part of a vehicle including a holding device for a mobile phone, or a mobile terminal, according to the second embodiment. In FIG. 13, the same reference numerals as those in FIGS. 1 to 3 denote the same or similar parts. In the second embodiment, a mobile-phone holding device 70 includes two support pipes 72 and 73 projecting from a boss 71 formed in an elongated shape on a lateral side of the steering post 10. The supports pipes 72 and 73 are formed of smaller-diameter pipe parts 72*a* and 73*a* and larger-diameter pipe parts 72*b* and 73*b*, respectively. The smaller-diameter pipe parts 72*a* and 73*a* are engaged with each other in a retractable manner. The larger-diameter pipe parts 72*b* and 73*b* have inner diameters that fit the outer diameters of the pipe parts 72*a* and 73*a*. The larger-diameter pipe parts 72*b* and 73*b* are slidably fitted in holes 71*a* and 71*b* which are formed in the boss 71 and extend horizontally inside the steering post 10. On the other hand, the smaller-diameter pipe parts 72*a* and 73*a* have their end portions joined to each other through a joining block 74. A holder 80 for a mobile phone 19 is fixed to the joining block 74.

When the holder 80 is used, the larger-diameter pipe parts 72*b* and 73*b* are pulled out of their respective holes 71*a* and 71*b*, and further the smaller-diameter pipe parts 72*a* and 73*a* are pulled out of their respective larger-diameter pipe parts 72*b* and 73*b*, in a telescoping manner. As a result, the holder 80 projects to its use position which is closer to the right side of the vehicle body than the wheel 14 is. On the other hand, when the holder 80 is not used, the smaller-diameter pipe parts 72*a* and 73*a* are pushed into their respective larger-diameter pipe parts 72*b* and 73*b*, and further the larger-diameter pipe parts 72*b* and 73*b* are pushed into their respective holes 71*a* and 71*b*. As a result, the part of the mobile-phone holding device 70 excluding the holder 80 is housed in the steering post 10.

Note that the holder 80 includes a vertical member 81 and a horizontal member 82 which hold a bottom portion of the mobile phone 19. The horizontal member 82 is split into multiple parts and configured to be extendable and retractable. Thus, when the holder 80 is not used, the mobile phone 19 is taken out of the holder 80, and the vertical member 81 is pushed toward the joining block 74. This makes it possible to minimize the amount that holder 80 projects from the steering post 10. Meanwhile, the boss 71 may not be provided to the steering post 10. Instead, the mobile-phone holding device 70 may be configured such that the holes 71*a* and 71*b* are formed directly in a curved portion of the steering post 10 and that the larger and smaller pipes 72 and 73 are housed in the holes 71*a* and 71*b*.

The beam 13 extending in a direction to traverse the steering post 10 can be provided with an electrode terminal member 75 which holds the female side of a USB connector and thus is electrically connectable. In FIG. 13, the electrode terminal member 75 is arranged adjacent to and along the core member (square pipe) 13*a* and is held by the cover member 13*b* which form the beam 13.

Figure 14:
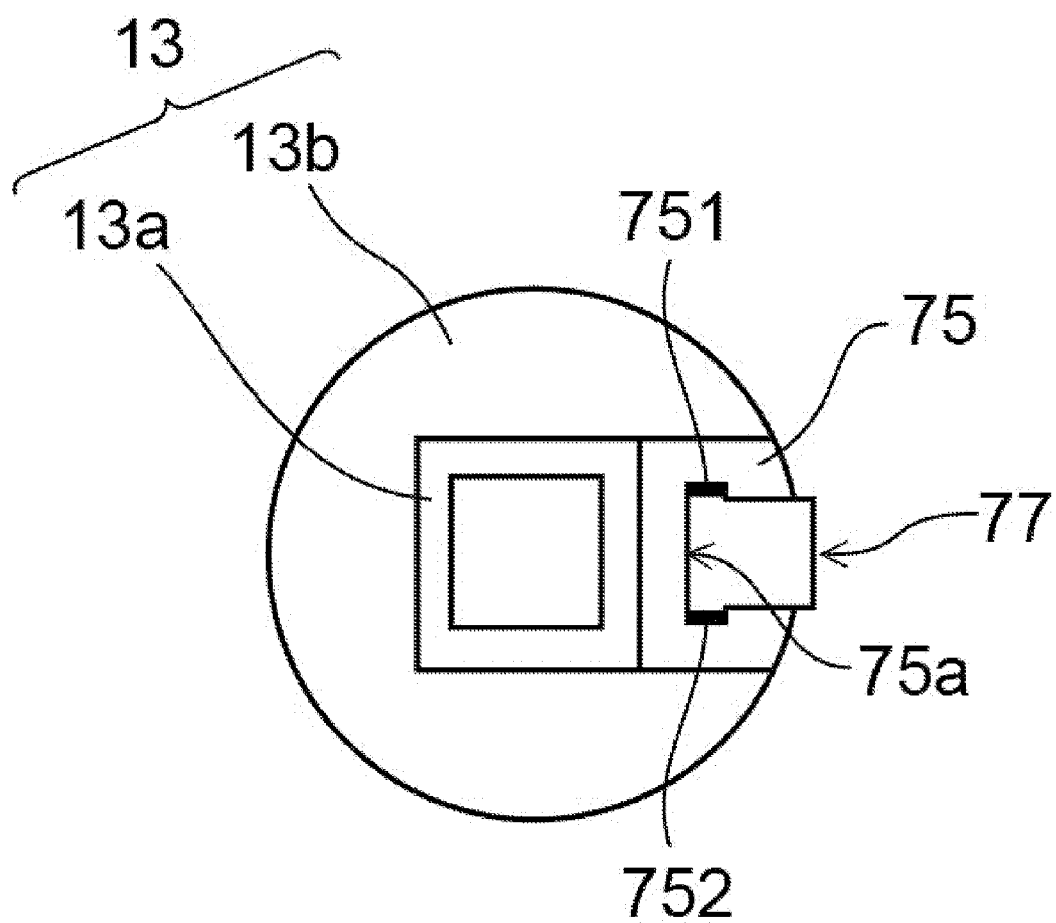
FIG. 14 is a side view of a beam including an electrode terminal member.
Figure 15:
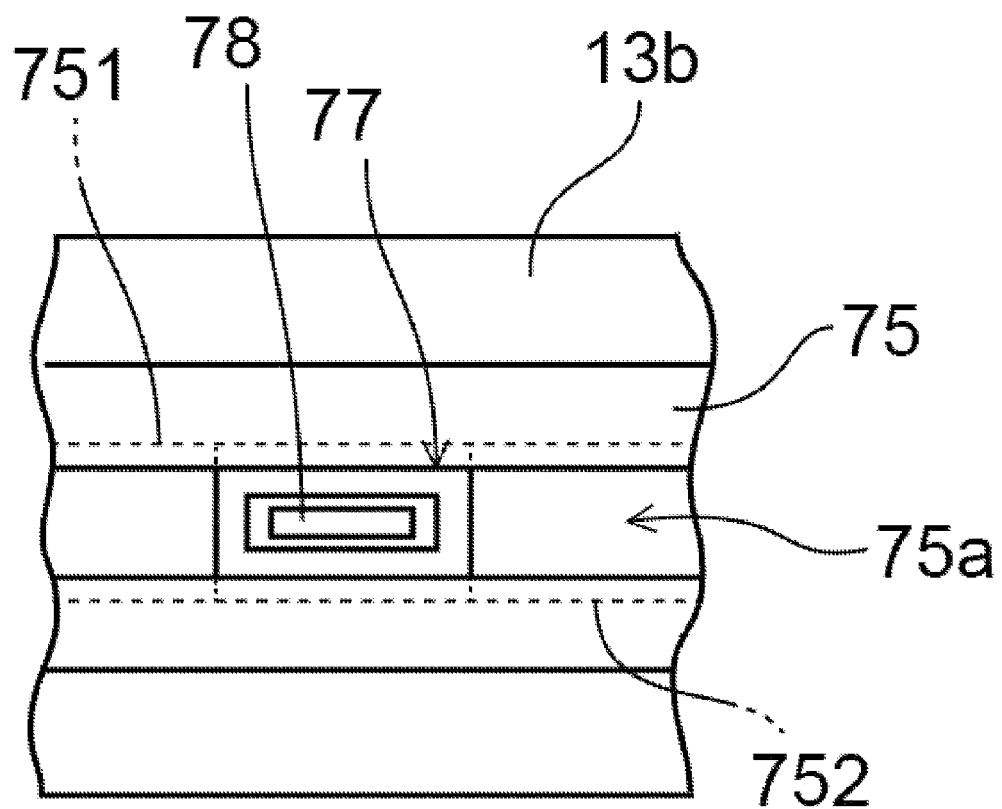
FIG. 15 is a front view of a main part of the beam including the electrode terminal member.
Figure 16:
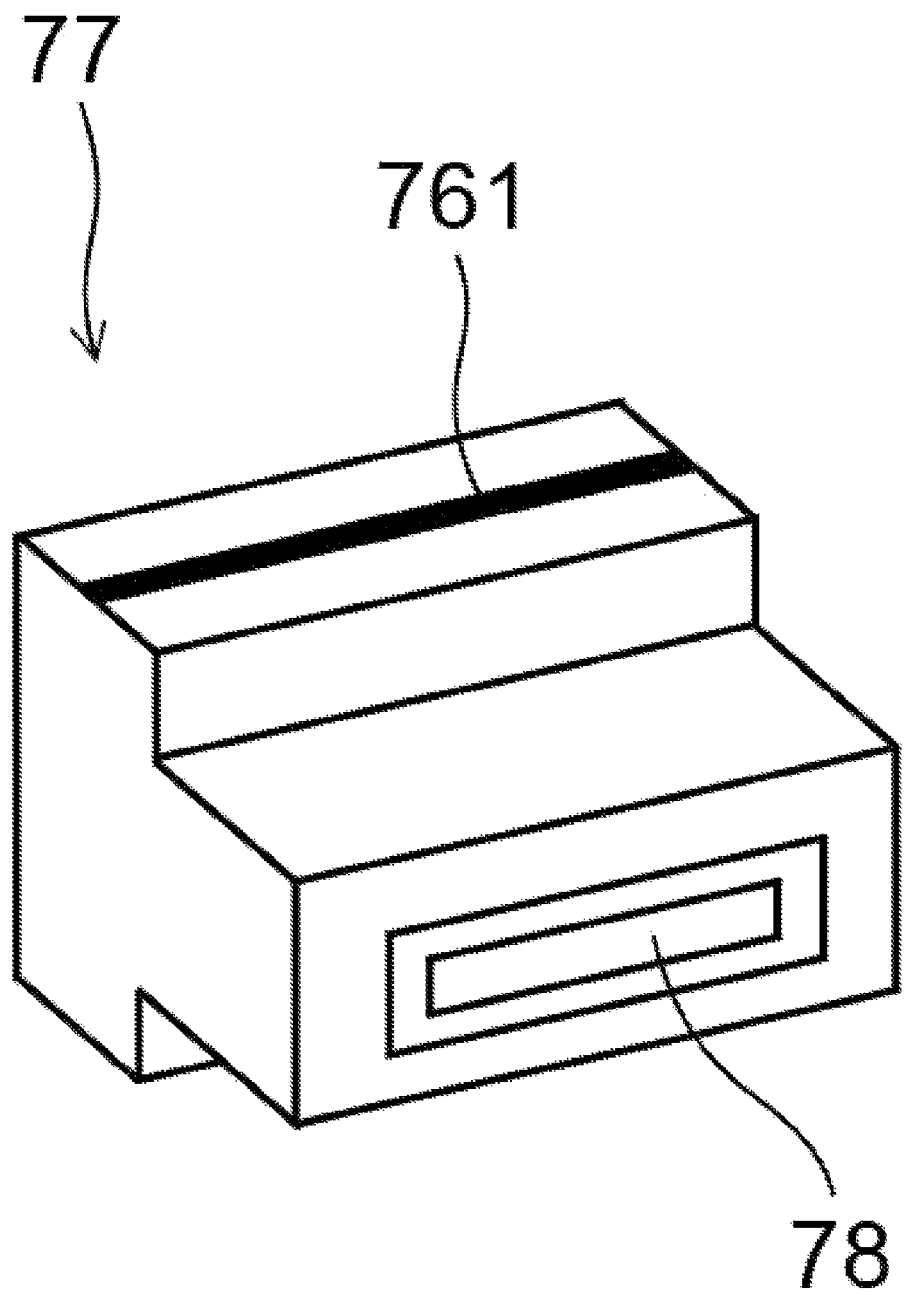
FIG. 16 is a perspective view of a block including the female side of a USB connector.

FIG. 14 is a side view of the beam 13 including the electrode terminal member 75. FIG. 15 is a front view of a main part of the beam 13 including the electrode terminal member 75. FIG. 16 is a perspective view of a block including the female side of the USB connector. The electrode terminal member 75 fixed by the cover member 13*b* of the beam 13 along the core member 13*a* thereof includes a cathode 751 and an anode 752. The electrode terminal member 75 is provided with a groove 75*a* in which a female-side block 77 of the USB connector can be mounted, the female-side block 77 having a cathode contact 761 and an anode contact (located on the opposite side from the cathode contact) which come in contact with the cathode 751 and the anode 752, respectively. The female-side block 77 is provided with a slot 78 to which the USB connector can be inserted.

With this configuration in which the female-side block 77 of the USB connector can be connected to the electrode terminal member 75, a device having the male side of the USB connector can be connected to the electrode terminal member 75 through the slot 78 of the female-side block 77. Then, electric signals can be exchanged between the microcomputer, which can be provided in the vehicle 1, and the device connected thereto through the USB by way of the electrode terminal member 75.

In each of the foregoing embodiments, the holder support member is arranged on the right side of the steering post 10. Note, however, that the present invention is not limited to this case, and the holder support member may be arranged on the left side. Moreover, the steering wheel may not be one with a circular gripping part, but may be of a bar type. Further, the type of vehicle is not limited to those as described above including a driver seat and only one rear seat as a passenger seat, but includes vehicles including multiple passenger seats.

Moreover, the in-vehicle mobile-terminal holding device of the present invention is suitable not only for holding a mobile phone, but also for placing a small-sized mobile information device such as a portable navigation device or a tablet inside the vehicle.

EXPLANATION OF THE REFERENCE NUMERALS

1 VEHICLE
4 FRONT BODY
8 STEERING WHEEL
10 STEERING POST
13 BEAM
14 WHEEL (GRIPPING PART)
17 CIRCULAR PAD
18, 70 MOBILE-PHONE HOLDING DEVICE
19 MOBILE PHONE
20, 80 HOLDER
21, 72, 73 HOLDER SUPPORT MEMBER
22 PIVOT SHAFT
31 BALL
32, 33 BALL RECEIVING RECESS
72, 73 SUPPORT PIPE

The invention claimed is:

1. An in-vehicle mobile-terminal holding device configured to hold a mobile terminal inside a vehicle, wherein the vehicle includes a steering post turnably supporting a steering wheel, said holding device comprising:
   a holder support member configured to be supported on the steering post, and
   a holder attached to a tip portion of the holder support member, said holder configured to detachably hold a mobile terminal,
   wherein the holder support member is configured to be housed in the steering post.

2. The in-vehicle mobile-terminal holding device according to claim 1, wherein
   the holder support member is disposed in an arc shape,
   the steering post is in a circular column shape,
   the steering post includes a pivot shaft supporting an end portion of the arc-shaped holder support member opposite from the tip portion thereof such that the holder support member is pivotable between a use position and a housed position, and wherein
   the steering post includes a housing space to house the holder support member in such a way that the arc shape of the holder support member follows an outer periphery of the steering post having the circular column shape.

3. The in-vehicle mobile-terminal holding device according to claim 1,
   wherein the steering wheel includes a gripping part, and
   at a use position of the holder support member, the holder is located radially outward of the gripping part in a front view of the steering wheel.

4. The in-vehicle mobile-terminal holding device according to claim 1, further comprising:
   a stopper configured to hold the holder support member at any one of a use position and a housed position to which a posture of the holder support member is changed from the use position by a predetermined angle is provided around the pivot shaft supporting the holder support member, said stopper comprising
   a ball receiving recess provided to any one of the holder support member and the steering post side, and
   a ball provided to the other of the holder support member and the steering post side and biased by a spring toward the ball receiving recess.

5. The in-vehicle mobile-terminal holding device according to claim 1,
wherein the holder includes
a horizontal portion configured to hold one side portion of the mobile terminal being rectangular in a front view thereof, and
vertical portions which rise from both ends of the horizontal portion and are configured to come in contact with side portions of the mobile terminal adjacent to the one side portion, and
wherein the holder is attached in such a way that a posture of the horizontal portion with respect to the holder support member is changeable by approximately 90° between a substantially horizontal position and a substantially vertical position.

6. The in-vehicle mobile-terminal holding device according to claim 5, wherein the horizontal portion of the holder has a groove which is configured to fit the one side portion of the mobile terminal.

7. The in-vehicle mobile-terminal holding device according to claim 5,
wherein the horizontal portion of the holder is split into two, and the holding device further comprising
a spring disposed in the two split horizontal portions in such a way as to apply contractive force in a direction to shorten a distance therebetween.

8. The in-vehicle mobile-terminal holding device according to claim 1,
wherein the holder support member comprises a pipe which is configured to be supported on the steering post, and to the tip portion of which the holder configured to detachably hold the mobile terminal is attached,
the pipe is disposed horizontally with respect to the steering post,
the pipe includes a plurality of pipe members of different diameters joined to each other, and
the pipe members adjacent to each other are configured to be extendable and retractable relative to each other by having an outer periphery of one pipe member slidably fitted to an inner periphery of the other pipe member, and
wherein the plurality of pipe members in the retracted state are capable of being housed in the steering post.

9. A vehicle, comprising:
a steering post;
a steering wheel turnably supported on the steering post, said steering wheel including a gripping part; and
a mobile-terminal holding device, said mobile-terminal holding device comprising
a holder support member configured to be supported on the steering post, and
a holder attached to a tip portion of the holder support member, said holder configured to detachably hold a mobile terminal,
wherein the holder support member is configured to be housed in the steering post,
wherein, at a use position of the holder support member, the holder is located radially outward of the gripping part in a front view of the steering wheel, and
wherein the steering post includes a circular pad disposed inside the circular gripping part of the steering wheel in the front view and is fixed to a side of the steering post side such that the circular pad does not follow turn of the gripping part, said vehicle further comprising
a plurality of switches and a display configured to display information including at least an operating state of the vehicle arranged along an outer circumference of the circular pad.

10. The vehicle according to claim 9, wherein of the plurality of switches, frequently-used predetermined switches are disposed in left and right regions of the circular pad.

11. An in-vehicle mobile-terminal holding device configured to hold a mobile terminal inside a vehicle, wherein the vehicle includes a steering post turnably supporting a steering wheel, said holding device comprising:
holder support means for being supported on the steering post, and
holder means attached to a tip portion of the holder support member, said holder means for detachably holding a mobile terminal,
wherein the holder support means is housed in the steering post.

12. The in-vehicle mobile-terminal holding device according to claim 11, wherein
the holder support means is disposed in an arc shape,
the steering post is in a circular column shape,
the steering post includes pivot shaft means for supporting an end portion of the arc-shaped holder support means opposite from the tip portion thereof such that the holder support means is pivotable between a use position and a housed position, and wherein
the steering post includes a housing space to house the holder support means in such a way that the arc shape of the holder support means follows an outer periphery of the steering post having the circular column shape.

13. The in-vehicle mobile-terminal holding device according to claim 11,
wherein the steering wheel includes a gripping part, and
at a use position of the holder support means, the holder means is located radially outward of the gripping part in a front view of the steering wheel.

14. The in-vehicle mobile-terminal holding device according to claim 11, further comprising:
stopper means for holding the holder support means at any one of a use position and a housed position to which a posture of the holder support means is changed from the use position by a predetermined angle is provided around the pivot shaft supporting the holder support means, said stopper means comprising
a ball receiving recess provided to any one of the holder support means and the steering post side, and
a ball provided to the other of the holder support means and the steering post side and biased by a spring toward the ball receiving recess.

15. The in-vehicle mobile-terminal holding device according to claim 11,
wherein the holder means includes
a horizontal portion configured to hold one side portion of the mobile terminal being rectangular in a front view thereof, and
vertical portions which rise from both ends of the horizontal portion and are configured to come in contact with side portions of the mobile terminal adjacent to the one side portion, and
wherein the holder means is attached in such a way that a posture of the horizontal portion with respect to the holder support member is changeable by approximately 90° between a substantially horizontal position and a substantially vertical position.

16. The in-vehicle mobile-terminal holding device according to claim 15, wherein the horizontal portion of the holder means has a groove which is configured to fit the one side portion of the mobile terminal.

17. The in-vehicle mobile-terminal holding device according to claim 15, wherein the horizontal portion of the holder means is split into two, and the holding device further comprises spring means disposed in the two split horizontal portions for applying contractive force in a direction to shorten a distance therebetween.

18. The in-vehicle mobile-terminal holding device according to claim 11, wherein the holder support means comprises pipe means for being supported on the steering post, and to the tip portion of which the holder means configured to detachably hold the mobile terminal is attached, the pipe means is disposed horizontally with respect to the steering post, the pipe means includes a plurality of pipe members of different diameters joined to each other, and the pipe members adjacent to each other are configured to be extendable and retractable relative to each other by having an outer periphery of one pipe member slidably fitted to an inner periphery of the other pipe member, and wherein the plurality of pipe members in the retracted state are capable of being housed in the steering post.

19. A vehicle, comprising:

steering post means for supporting at least one component thereon;

steering wheel means for being turnably supported on the steering post means, said steering wheel including a gripping part; and mobile-terminal holding means for supporting a mobile terminal, said mobile-terminal holding means comprising holder support means for being supported on the steering post means, and holder means attached to a tip portion of the holder support means, said holder means for detachably holding the mobile terminal, wherein the holder support means is also for being housed in the steering post means, wherein, at a use position of the holder support means, the holder means is located radially outward of the gripping part in a front view of the steering wheel means, wherein the steering post means includes a circular pad disposed inside the circular gripping part of the steering wheel means in the front view and is fixed to a side of the steering post means such that the circular pad does not follow turn of the gripping part, said vehicle further comprising a plurality of switch means for switching and a display means for displaying information including at least an operating state of the vehicle arranged along an outer circumference of the circular pad.

20. The vehicle according to claim 19, wherein of the plurality of switch means, frequently-used predetermined switches are disposed in left and right regions of the circular pad.

* * * * *